(12) United States Patent
Wei et al.

(10) Patent No.: US 12,457,990 B2
(45) Date of Patent: Nov. 4, 2025

(54) DEVICE FOR CLEANING PET FECES AUTOMATICALLY AND INTELLIGENTLY

(71) Applicant: SHENZHEN LALAHOME SMARTECH CO., LTD., Shenzhen (CN)

(72) Inventors: Yanjiatai Wei, Shenzhen (CN); KaiShu Hui, Shenzhen (CN); Zhixing Wei, Shenzhen (CN); Guohong Tan, Shenzhen (CN)

(73) Assignee: SHENZHEN LALAHOME SMARTECH CO., LTD., Shenzhen (CN)

( * ) Notice: Subject to any disclaimer, the term of this patent is extended or adjusted under 35 U.S.C. 154(b) by 230 days.

(21) Appl. No.: 18/319,264

(22) Filed: May 17, 2023

(65) Prior Publication Data
US 2024/0306595 A1    Sep. 19, 2024

(30) Foreign Application Priority Data

Mar. 17, 2023    (CN) .......................... 202310273884.7

(51) Int. Cl.
*A01K 1/01* (2006.01)
*A01K 29/00* (2006.01)

(52) U.S. Cl.
CPC ................................. *A01K 1/0114* (2013.01)

(58) Field of Classification Search
CPC .... A01K 1/0114; A01K 1/011; A01K 1/0128; A01K 1/0132
See application file for complete search history.

(56) References Cited

U.S. PATENT DOCUMENTS

| | | | | |
|---|---|---|---|---|
| 7,017,519 | B1 * | 3/2006 | Deasy | A01K 1/011 |
| | | | | 119/166 |
| 11,399,502 | B2 * | 8/2022 | Baxter | A01K 1/011 |
| 2005/0224003 | A1 * | 10/2005 | Yin | A01K 5/0275 |
| | | | | 119/61.5 |

(Continued)

FOREIGN PATENT DOCUMENTS

| | | | | |
|---|---|---|---|---|
| BE | 1012270 A3 * | 8/2000 | | A01K 1/0114 |
| CN | 110521611 A * | 12/2019 | | A01K 1/0114 |
| CN | 111512975 A * | 8/2020 | | A01K 1/0107 |

(Continued)

OTHER PUBLICATIONS

CN 111512975 A machine translation. (Year: 2020).*
CN 113728931 A machine translation. (Year: 2021).*

*Primary Examiner* — Son T Nguyen
(74) *Attorney, Agent, or Firm* — Michael Bartholomew

(57) ABSTRACT

The present invention relates to the technical field of a cat toilet, and specifically to a device for cleaning a pet feces automatically and intelligently, including a cat toilet main machine (1), a toilet bin (2) arranged inside the main machine, and a detachable feces collecting bin (4). The toilet bin (2) and the feces collecting bin (4) are communicated to each other. The toilet bin (2) is provided therein with an automatically cleaning feces mechanism. The automatically cleaning feces mechanism is configured to transport the feces in the toilet bin (2) to the feces collecting bin (4). No manual cleaning is required. The feces collecting bin is easy to disassemble. It is more convenient to take out the feces.

9 Claims, 17 Drawing Sheets

(56) References Cited

U.S. PATENT DOCUMENTS

2020/0236896 A1* 7/2020 Noh ................... A01K 1/011
2023/0107468 A1* 4/2023 Wang .................. A01K 1/011
                                                        119/165

FOREIGN PATENT DOCUMENTS

| CN | 113728931 A | * | 12/2021 | |
|----|-------------|---|---------|-----------|
| CN | 113854160 A | * | 12/2021 | ........... A01K 1/0107 |
| CN | 112470951 B | * | 2/2022  | ........... A01K 1/0047 |
| CN | 113875602 B | * | 5/2023  | |

* cited by examiner

DEVICE FOR CLEANING PET FECES AUTOMATICALLY AND INTELLIGENTLY

REFERENCE TO PRIOR APPLICATION

This application claims priority to Chinese Patent Application 202310273884.7, filed on Mar. 17, 2023, which is incorporated herein by reference.

TECHNICAL FIELD

The present invention relates to the technical field of a cat toilet, and specifically to a device for cleaning a pet feces automatically and intelligently.

TECHNICAL BACKGROUND

With the improvement of people's living standard, more and more families raise a pet. A pet cat is a relatively popular pet. However, while the pet cat gives people joy, the pet cat also generates some troubles, for example, the pet cat does not have a fixed excretion place and defecates anywhere. Therefore, a cat toilet for the pet cat also appears. However, most commonly used cat toilets are just simple litter pots. After the pet cat defecates on a litter, the pet cat still needs people to manually remove feces. If the feces is not removed in time, there is a lot of odor, leading to bacteria breeding. The cat toilet in the prior art is very inconvenient to use.

SUMMARY

An objective of the present invention is to provide a device for cleaning a pet feces automatically and intelligently, which solves the problems in the forgoing technical field.

To achieve the above objective, the present invention provides the following technical solutions:

A device for cleaning a pet feces automatically and intelligently includes a cat toilet main machine (1), a toilet bin (2) arranged inside the main machine, and a detachable feces collecting bin (4). The toilet bin (2) and the feces collecting bin (4) are communicated to each other. The toilet bin (2) is provided therein with an automatically cleaning feces mechanism. The automatically cleaning feces mechanism is configured to transport the feces in the toilet bin (2) to the feces collecting bin (4).

Preferably, the front side of the toilet bin (2) is provided with an opening. The automatically cleaning feces mechanism includes a litter shovel. The litter shovel is capable of sliding from the rear end of the toilet bin (2) to the front end of the toilet bin. The feces collecting bin (4) is provided with a closable feces collecting opening at the end of the movement track of the litter shovel. The feces collecting opening can be closed, thereby effectively avoiding odor emitted in a feces storage region to pollute the toilet bin. The feces collecting opening has the same direction as the opening direction of the toilet bin. Because the pet can be driven to move towards the opening of the toilet bin during the movement of the litter shovel, when cleaning the feces, the litter shovel moves from an opening of a rear toilet bin, thereby avoiding an accidental injury to a pet due to a mistake if the toilet bin is cleaned when the pet is in the toilet bin.

Preferably, the automatically cleaning feces mechanism includes a rotating device, a connecting swing arm, and the litter shovel. The litter shovel is connected to the rotating device via the connecting swing arm. The rotating device drives the litter shovel to swing around the rotating axis of the rotating device. The litter shovel oscillates in an arc. The actual cleaning effects are as follows: the feces is plucked from the bottom of a litter piled up in the toilet bin diagonally upwards, and a cleaning effect is better.

Preferably, the bottom of the toilet bin is provided with an arc-shaped part. The arc-shaped part is shaped to match the movement track of the end of the litter shovel. The end of the arc-shaped part near the feces collecting opening is provided with a litter filtering strip. The litter filtering strip extends along the direction of the movement of the end of the litter shovel, so that the feces forms a gap with the inner wall of the toilet bin when the feces is plucked by the litter shovel to move towards the feces collecting opening. In a process of plucking, the feces sticky with a litter is moved to the litter filtering strip. The litter which is not sticky or less sticky at the periphery of the litter filtering strip can flow away from the gap between the bottom of the feces and the inner wall of the toilet bin.

Preferably, a U-shaped pressing bar is movably clamped and connected to the top of a rear bin of the feces collecting bin. A clamp groove is arranged on the U-shaped pressing bar. The inner side of the clamp groove protrudes and is provided with a clamp bump. The upper end of a front bin of the feces collecting bin corresponding to the clamp groove and the clamp bump and are provided with a mating groove. The clamp bump is snap-fitted into the mating groove via the U-shaped pressing bar so that the U-shaped pressing bar is mounted at the upper end of the front bin of the feces collecting bin, thereby fixing the side of the opening of a pet feces collecting bag.

The inner wall of the rear bin of the feces collecting bin is fixedly mounted with a corresponding sliding rail via a fixing bolt, respectively.

The inner part of the sliding rail provided at two sides is opened and provided with a sliding groove.

A sliding pressing bar moves forward to be close to the U-shaped pressing bar. The sliding pressing bar moves backward to be away from the U-shaped pressing bar. The sliding pressing bar is a foldable pressing bar. The sliding pressing bar is divided into a pressure-bearing seat and a foldable pressing bar. The two ends of the pressure-bearing seat are slidingly connected in the sliding groove. The middle of the pressure-bearing seat is opened and provided with a fastening groove. The foldable pressing bar is connected to the outer side of the pressure-bearing seat. The foldable pressing bar corresponds to the fastening groove as well as protrudes and is provided with a fastening part. The foldable pressing bar is turned over and clamped on the pressure-bearing bar and fixedly fastened in the fastening groove.

Preferably, the top of the rear bin of the feces collecting bin is connected to a litter leakage pedal. The litter leakage pedal is embedded and mounted in the upper end of a rear bin of the feces collecting bin. The litter leakage pedal is hollow. The end of the inner side of the litter leakage pedal is opened and provided with an opening. The upper end surface of the litter leakage pedal is passed through with, opened and provided with a litter leakage hole. The litter leakage hole, the middle of the litter leakage pedal, and the end of the inner side of the litter leakage pedal are opened to form one passage:

The upper end of the inner side of the litter leakage pedal protrudes upwardly to form a position limiting part. The position limiting part extends into the toilet bin. The hollow part of the litter leakage pedal is provided with a plurality of partition plates. The upper end of the partition plate is connected to the hollow upper surface of the litter leakage pedal. The partition plate separates the hollow part of the litter leakage pedal to form a plurality of passages.

The two sides of the lower surface of the front end of the litter leakage pedal are provided with a positioning round foot. The rear bin of the feces collecting bin corresponds to the positioning round foot and is provided with a positioning base. The positioning round foot cooperates with the positioning base to position the litter leakage pedal.

Preferably, the side wall of the inner end of the front bin of the feces collecting bin is provided with a docking frame. A clamp plate is mounted at the end of the docking frame. The end of the clamp plate is provided with a rubber protrusion. An inner plate is provided in the main machine. A position limiting clamp plate is provided on the side wall of the inner plate. The docking frame is clamped in the middle of a position limiting clamp plate. The side wall of the inner plate is opened and provided with a docking groove. The upper end of the docking groove is opened and provided with a clamp opening. The clamp plate is correspondingly embedded in the docking groove. The plastic protrusion is clamped and connected in the clamp opening.

Preferably, the automatically adding litter mechanism includes a litter falling opening opened and provided at the bottom surface of an automatically adding litter bin. The litter falling opening is a sector-shaped structure. A central column is rotatably mounted in the automatically adding litter bin. One motor mounting plate is fixedly mounted on the bottom surface of the automatically adding litter bin via a screw. An adding litter motor is arranged on the motor mounting plate. Output terminals of the adding litter motor are connected via a central column of a gear set. A litter dividing member is fixedly sleeved on the central column.

Preferably, the inner wall of the litter dividing member is provided with a position limiting bar embedded in a recess of the side wall of the central column. The litter dividing member is provided with five blades. The bottom surface of each of the blades is capable of covering the litter falling opening. A gap between the adjacent blades has the same shape as the litter falling opening. A magnet is embedded and mounted on a bottom surface of the blade.

Preferably, a sterilization and deodorization assembly includes a UV sterilization lamp and an ozone deodorizer. Two groups of the UV sterilization lamps are mounted in the middle of the side wall of the toilet bin close to the top of the toilet bin. The opening of the toilet bin is a hollow structure. The ozone deodorizer is mounted above the feces collecting bin inside the opening.

Preferably, a control main board is arranged in the cat toilet main machine. The inner part of the toilet bin is provided with a weighing module for weighing. The weighing module transmits the weight signal of the toilet bin to the control main board. After receiving the weight signal, the control main board transmits the weight signal to the adding litter motor and controls the adding litter motor to rotate to realize the process of litter addition.

Compared with the prior art, the present invention has the following beneficial effects:

Because a device for cleaning a pet feces automatically and intelligently proposed by the present invention is provided with an automatically cleaning feces mechanism, a conveniently disassembled feces collecting bin, an automatically adding litter mechanism, and a sterilization and deodorization assembly. The device can automatically clean the feces in the toilet bin to the feces collecting bin without the need for manual cleaning. The feces collecting bin is easy to disassemble, so it is more convenient to take out the feces. When a litter is insufficient, the litter can be automatically added to the toilet bin. A UV sterilization lamp and an ozone deodorizer can play the functions of sterilization and deodorization, as well as the purification of a use environment.

Figure 1:
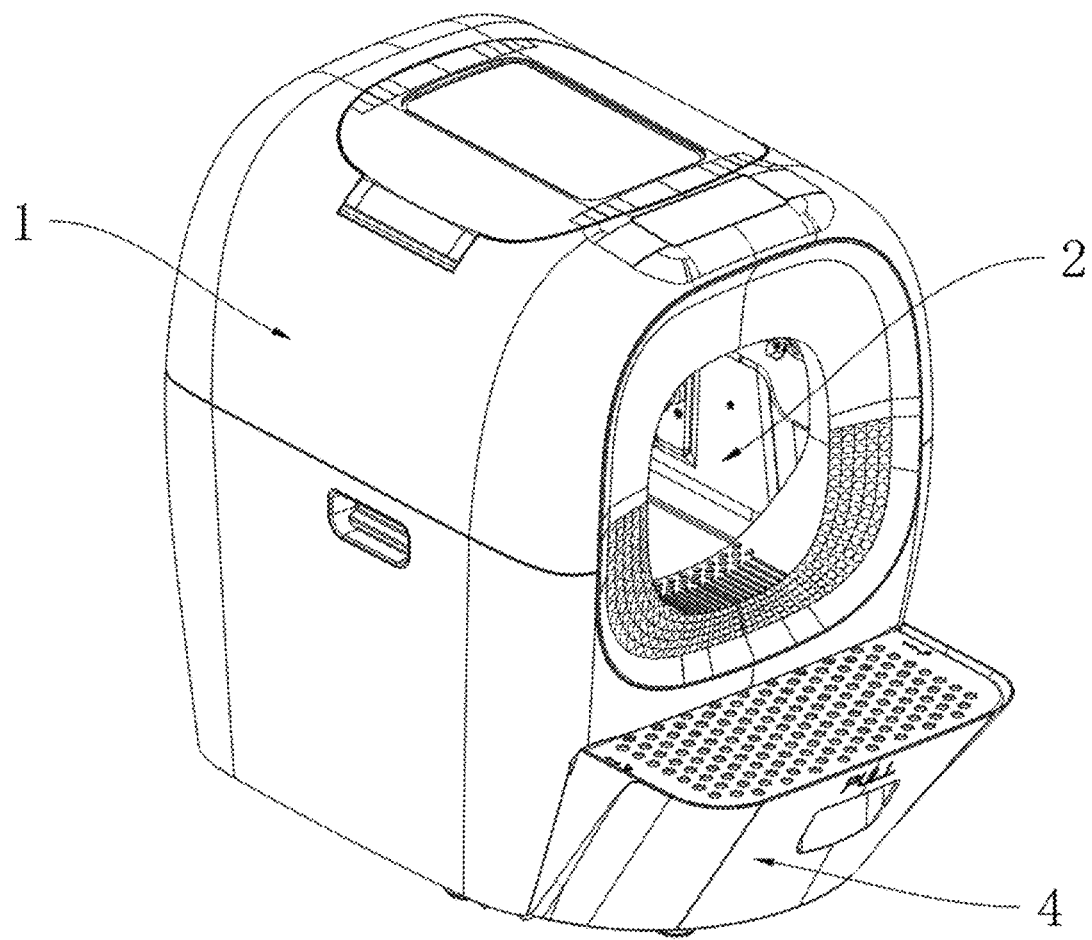
FIG. 1 is an appearance structure diagram of a device of the present invention.
Figure 2:
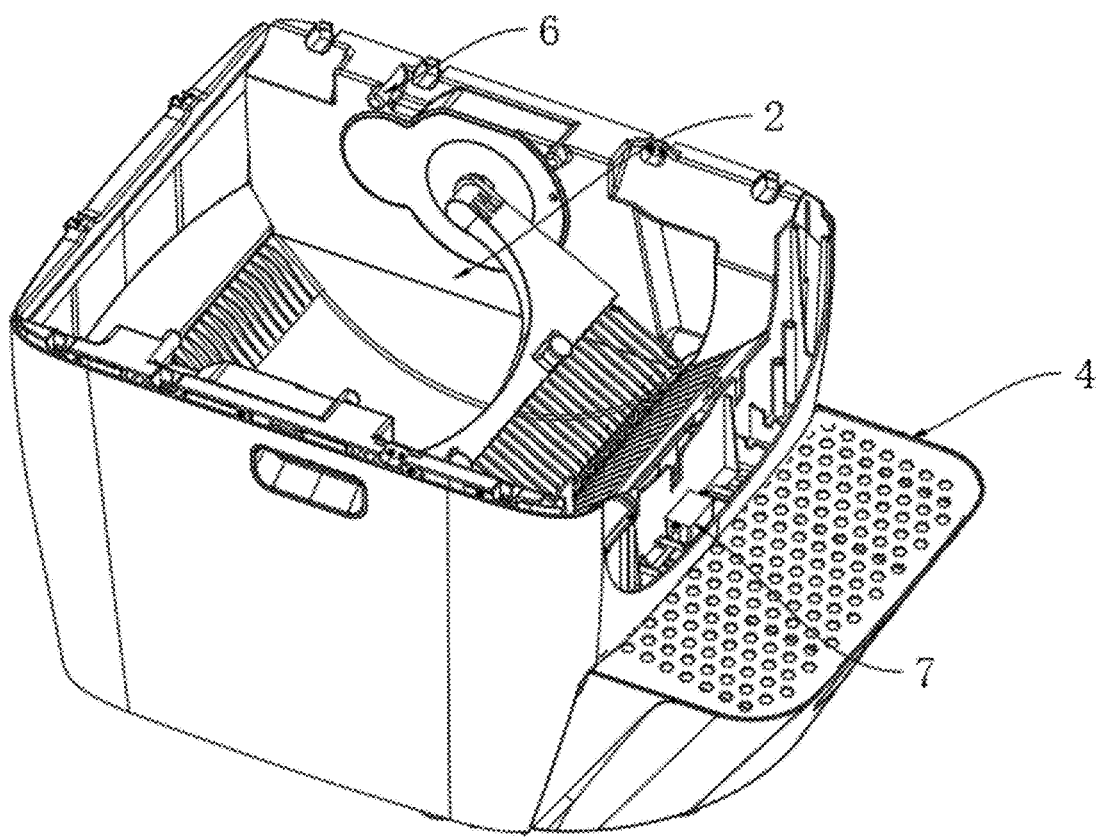
FIG. 2 is a structure diagram 1 of a toilet bin of the present invention.

In the figures: cat toilet main machine 1, toilet bin 2, movable plate 201, litter shovel 202, litter shoveling motor 203, sealing plate 204, door-opening motor 205, toilet bin opening 3 of main machine, inner plate 301, position limiting clamp plate 302, docking groove 303, clamp opening 304, feces collecting bin 4, litter leakage pedal 401, position limiting part 402, positioning round foot 403, partition plate 404, litter leakage hole 405, rear bin 406 of feces collecting bin, positioning base 407, front bin 408 of feces collecting bin, docking frame 409, clamp plate 4010, U-shaped pressing bar 4011, clamp groove 4012, sliding rail 4013, sliding groove 4014, sliding pressing bar 4015, rolling ball 4016, mounting rod 4017, automatically adding litter bin 5, litter falling opening 501, central column 502, adding litter motor 503, litter dividing member 504, UV sterilization lamp 6, ozone deodorizer 7.

DETAILED DESCRIPTION OF EMBODIMENTS

The following clearly and completely describes the technical solutions in embodiments of the present invention in conjunction with the drawings in the embodiments of the present invention. Obviously, the described embodiments are only a part of the embodiments of the present invention, rather than all embodiments. Based on the embodiments of the present invention, all other embodiments obtained by the person skilled in the art without inventive work shall fall within the protection scope of the present invention.

Referring to FIGS. 1 to 17, the present invention provides a technical solution: a device for cleaning a pet feces automatically and intelligently includes a cat toilet main machine 1. Handles are provided on the both walls of the cat toilet main machine 1 to facilitate the carrying and picking up of the device as a whole. A control panel is provided on the top surface of the cat toilet main machine 1. A toilet bin 2 is provided inside the cat toilet main machine 1. A temperature measuring device and an in vivo sensing lamp are arranged inside the toilet bin 2. A toilet bin opening 3 of the main machine is arranged below the toilet bin 2. The inner part of the toilet bin 2 is provided with an automatically cleaning feces mechanism. The toilet bin opening 3 of the main machine is provided with a feces collecting bin 4 for easy disassembly. The automatically cleaning feces mechanism includes a rotating device, a connecting swing arm, and a litter shovel. The litter shovel is connected to the rotating device via the connecting swing arm. The rotating device drives the litter shovel to swing around the rotating axis thereof. The rotating device is two litter shoveling motors 203 symmetrically mounted in the side walls of the toilet bin 2. The connecting swing arm is formed on a movable plate 201. The litter shovel 202 is located at the end of the movable plate 201. A gap between the litter shovels 202 is not less than 5 mm, so that a litter can leak out of the gap when the feces is shoveled. The two ends of the movable plate 201 are provided with a rotating shaft mounted on the wall of the inner side of the toilet bin 2. The rotating shaft is connected to a large gear. An output end of the litter shoveling motor 203 is connected to a small gear. The small gear is meshed with and connected to the large gear. The two litter shoveling motors 203 rotate synchronously. One end of the toilet bin 2 is provided with a sealing plate 204. The sealing plate 204 is connected to a door-opening motor 205. The two ends of the sealing plate 204 are rotatably connected to the side wall of the opening of the toilet bin 2. One square notch is provided at the top of the sealing plate 204. The door-opening motor 205 is located in the square notch. An output shaft of the door-opening motor 205 is fixedly connected to the sealing plate 204. The door-opening motor 205 is fixed at the opening of the toilet bin 2 via a plurality of screws. When a pet cat finishes defecating, the door-opening motor 205 starts to drive the sealing plate 204 so that the sealing plate 204 becomes vertical. The opening on the feces collecting bin 4 is connected to the toilet bin 2. The litter shoveling motor 203 starts to drive the movable plate 201 and the litter shovel 202 to rotate, which can push the feces caked with the litter to a feces collecting opening 4A of the feces collecting bin 4. The feces falls into the feces collecting bin 4, thus achieving the effect of automatic cleaning.

Figure 3:
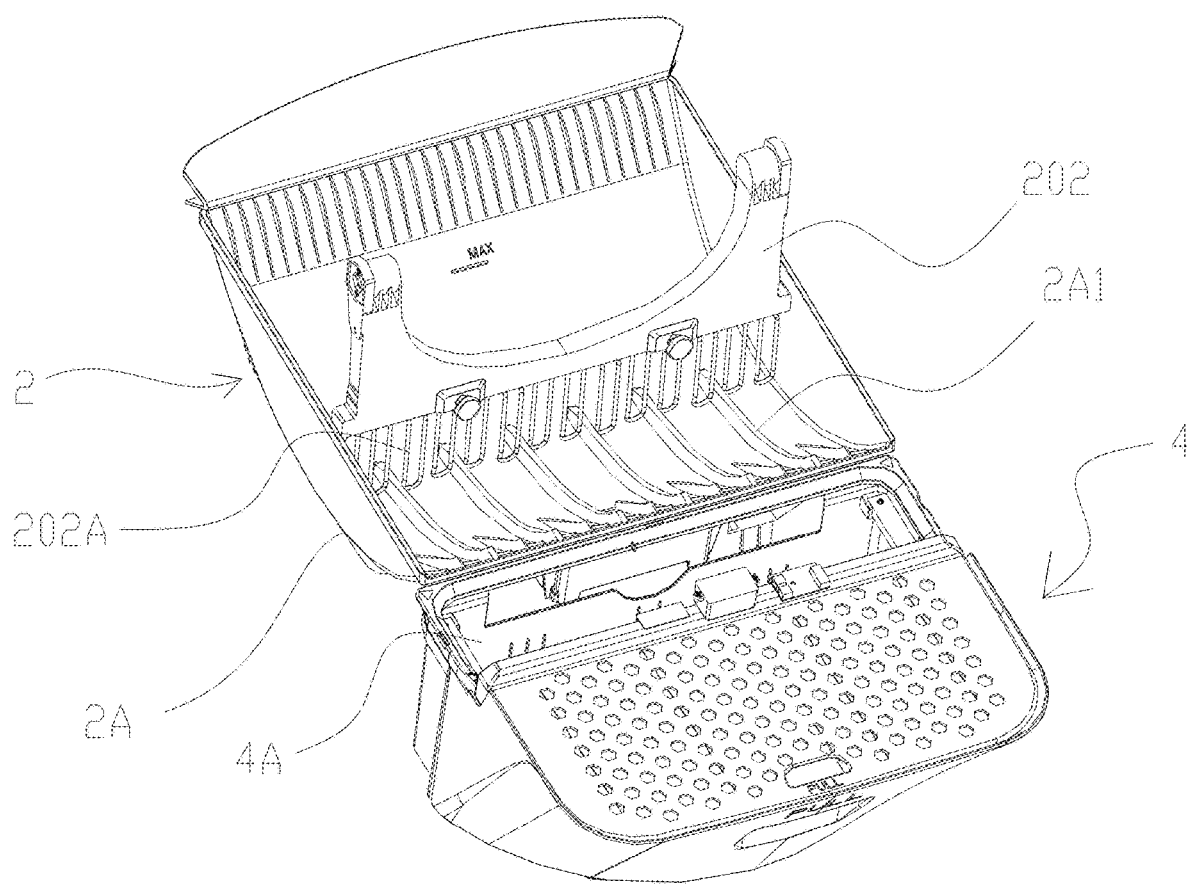
FIG. 3 is a structure diagram 2 of a toilet bin of the present invention.
Figure 4:
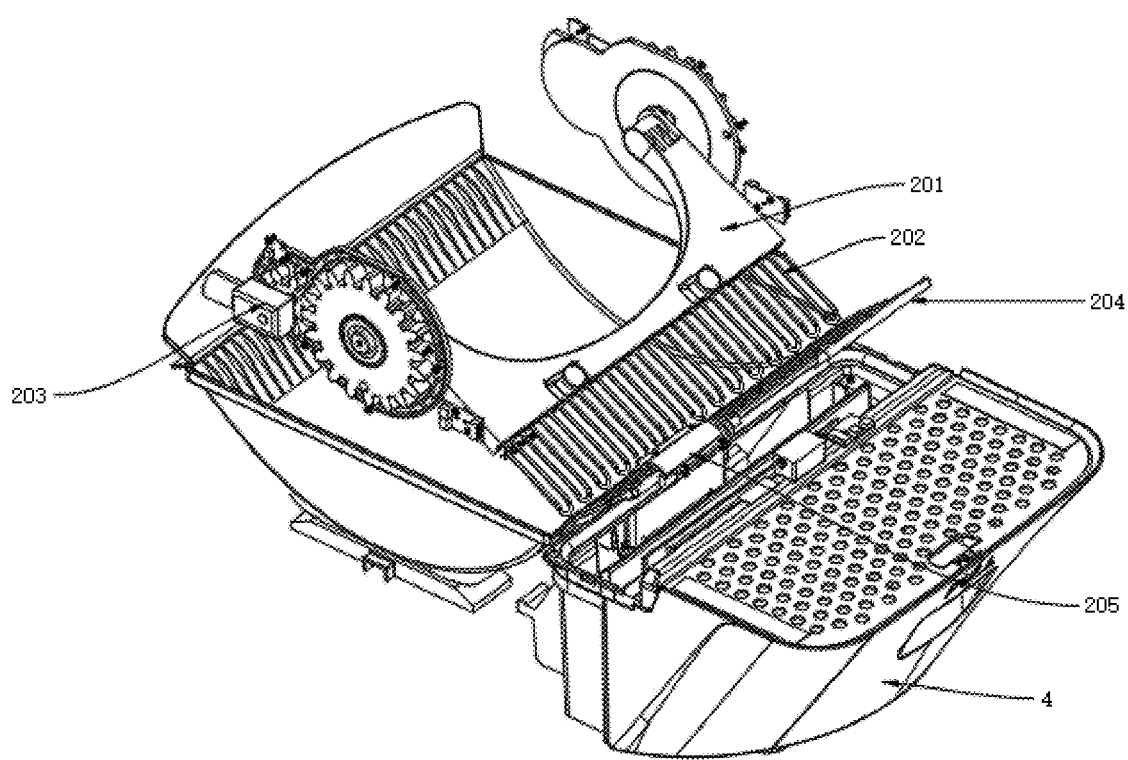
FIG. 4 is a structure diagram of an automatically cleaning feces mechanism of the present invention.
Figure 5:
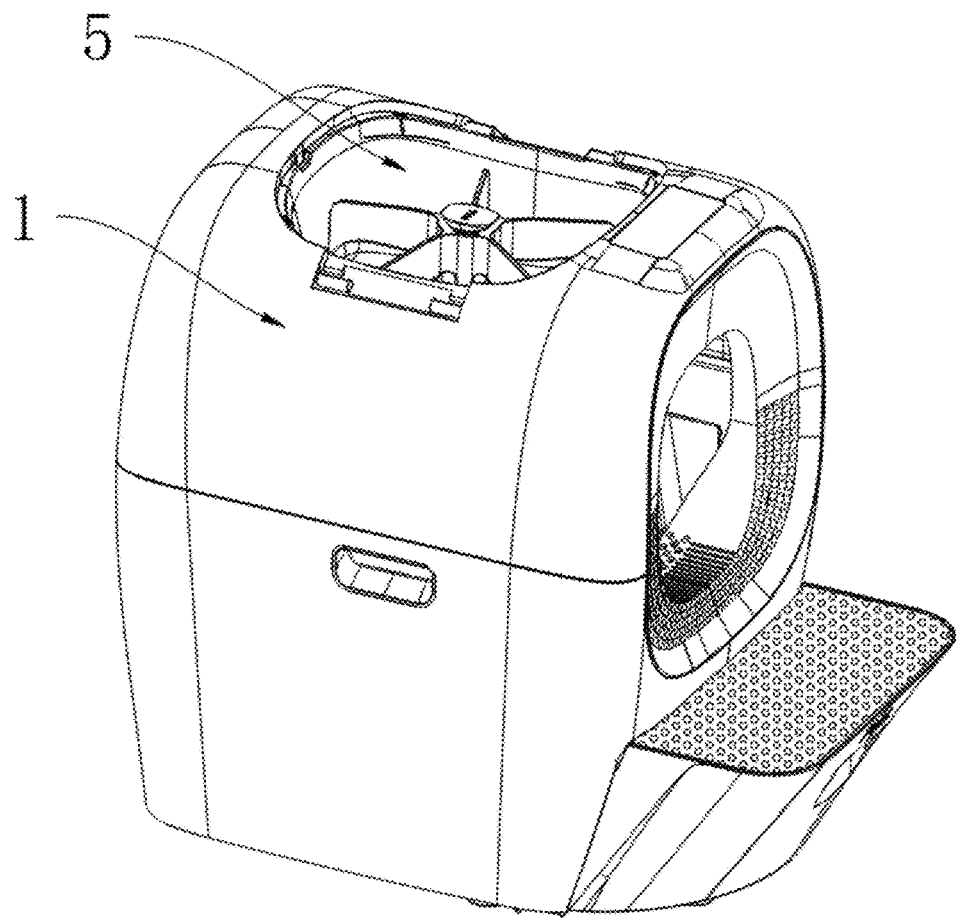
FIG. 5 is a structural diagram of an automatically adding litter bin of the present invention.
Figure 6:
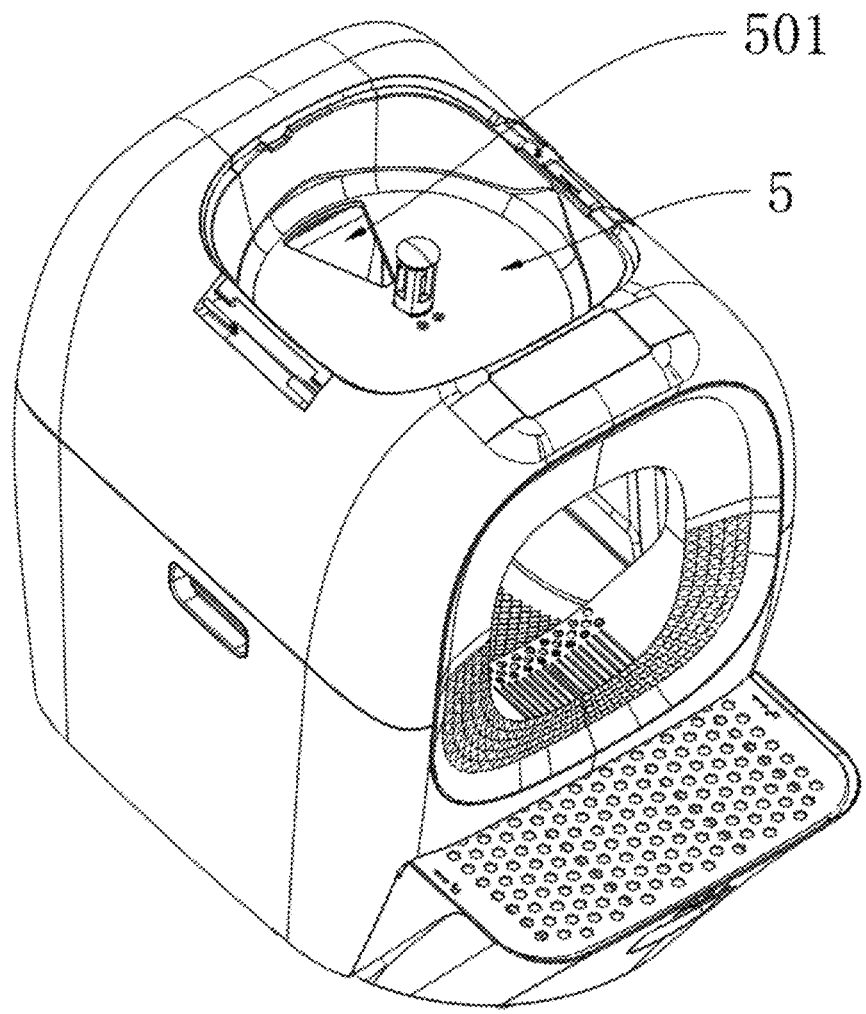
FIG. 6 is a structure diagram of a bottom surface of an automatically adding litter bin of the present invention.
Figure 7:
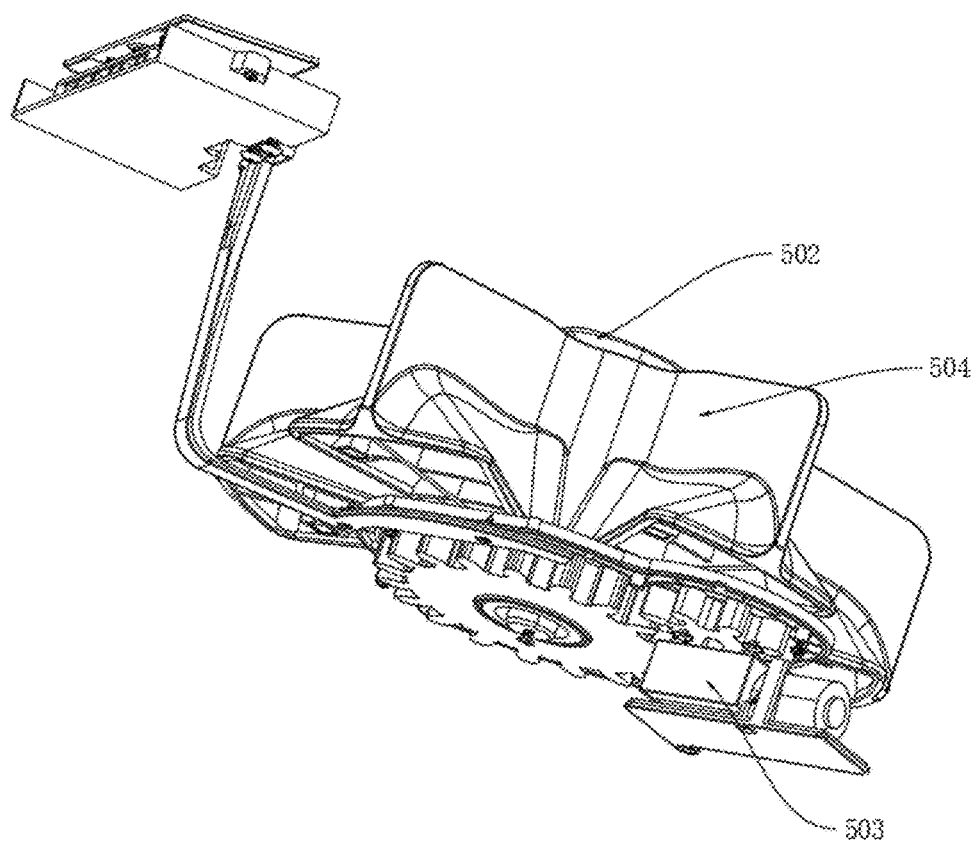
FIG. 7 is a structure diagram of the automatically adding litter mechanism of the present invention.
Figure 8:
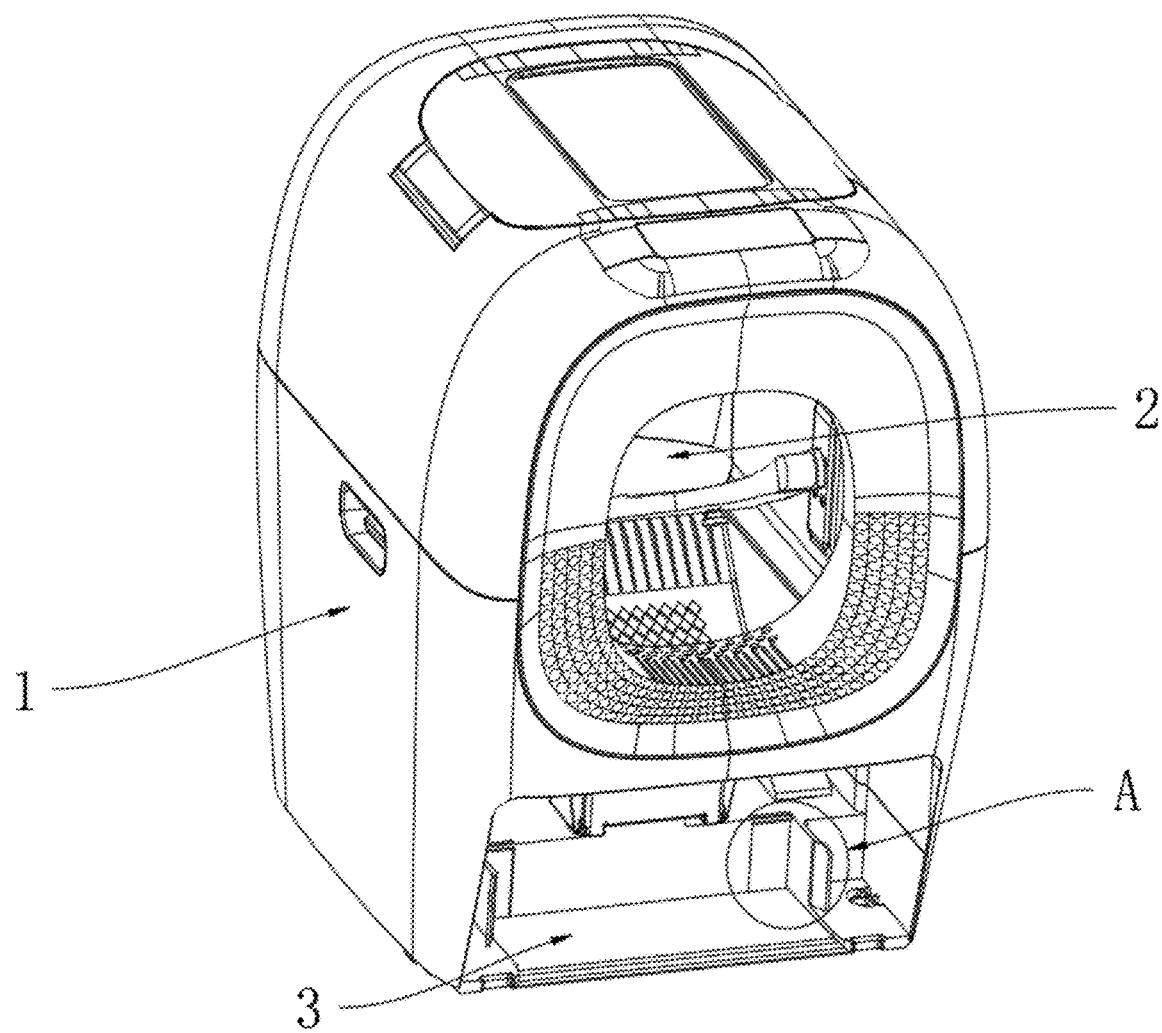
FIG. 8 is a structure diagram of a toilet bin opening of a main machine of the present invention.
Figure 9:
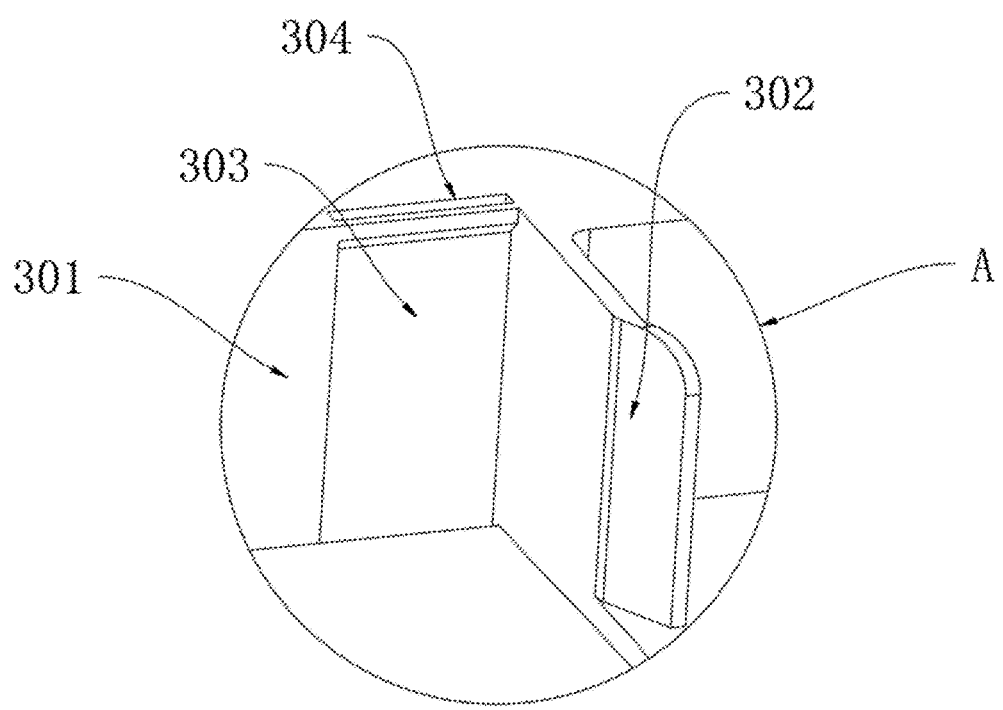
FIG. 9 is an enlarged diagram at A in FIG. 7.
Figure 10:
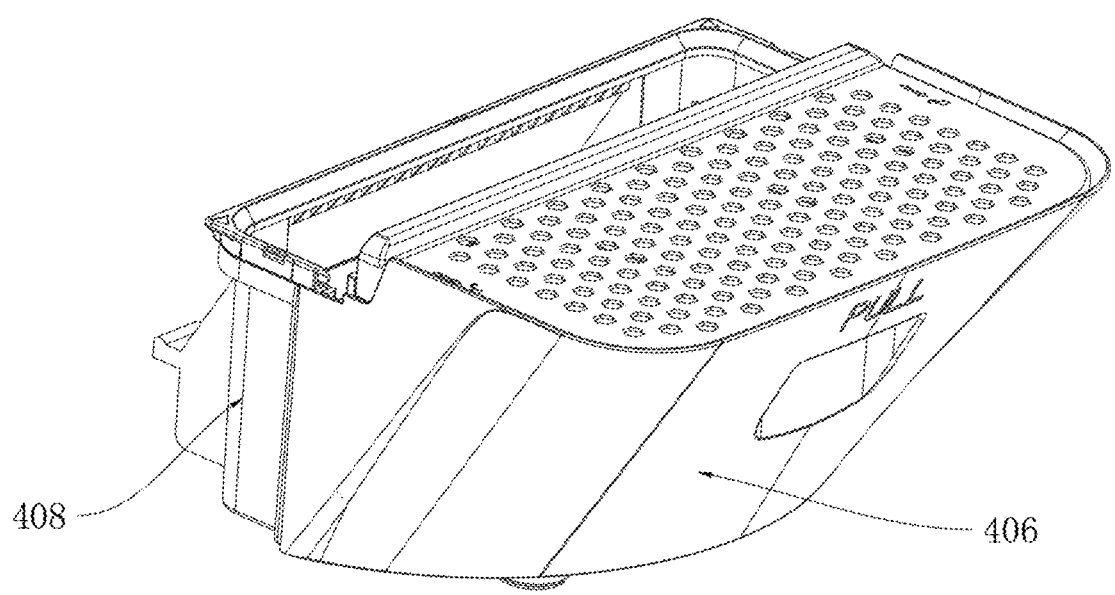
FIG. 10 is a structure diagram of a feces collecting bin of the present invention.

Referring to FIGS. 3 and 4, to avoid excessive litter from being pushed into the feces collecting bin 4 during cleaning, the bottom of the toilet bin 2 is provided with an arc-shaped part 2A. The arc-shaped part 2A is shaped to match the movement track of the end of the litter shovel 202. One end of the arc-shaped part 2A near the feces collecting port 4A is provided with a litter filtering strip 2A1. The litter filtering strip 2A1 extends along the movement direction of the end of the litter shovel 202, so that when the feces is plucked by the litter shovel 202 towards the feces collecting opening 4A, the feces forms a gap with the inner wall of the toilet bin 2. In the process of plucking, the feces sticky with the litter moves to the litter filtering strip 2A1. The litter which is not sticky or less sticky at the periphery of the litter filtering strip can flow away from the gap between the bottom of the feces and the inner wall of the toilet bin 2. The litter filtering strip 2A1 has two or more different lengths. The end of the litter shovel 202 is tooth sheets 202A that are spaced. The tooth sheets 202A are arranged side by side. A part of the tooth sheets are staggered with the front and rear positions of the adjacent tooth sheets, so that the end of the litter shovel forms an uneven surface. Therefore, in the process of plucking with the litter shovel 202, the litter which is not sticky or less sticky at the periphery of the feces can flow away from the staggered position between the tooth sheets 202A.

In the specific embodiment of the present invention, the following example I is provided for the feces collecting bin 4 and a sliding rail 4013:

The feces collecting bin 4 is arranged as an all-in-one.

The sliding rail 4013 is arranged as a single all-in-one.

This example setting can improve overall rigidity and facilitate user experience.

In the specific embodiment of the present invention, the following embodiment II is provided for the toilet bowl 4:

The feces collecting bin 4 includes a front bin 408 of the feces collecting bin that is movably mounted. A rear bin 406 of the feces collecting bin is movably mounted at the corresponding end of the front bin 408 of the feces collecting bin.

The sliding rail 4013 includes a front guide rail and a rear guide rail. The front guide rail is fixed in the upper end of the front bin of the feces collecting bin via a bolt. The rear guide rail is fixed on the inner wall of the rear bin 406 of the feces collecting bin via the bolt. The connection part between the front guide rail and the rear guide rail is internally provided and protrudes a position limiting part. The position limiting parts are fixed by a fixing shaft therebetween.

Figure 11:
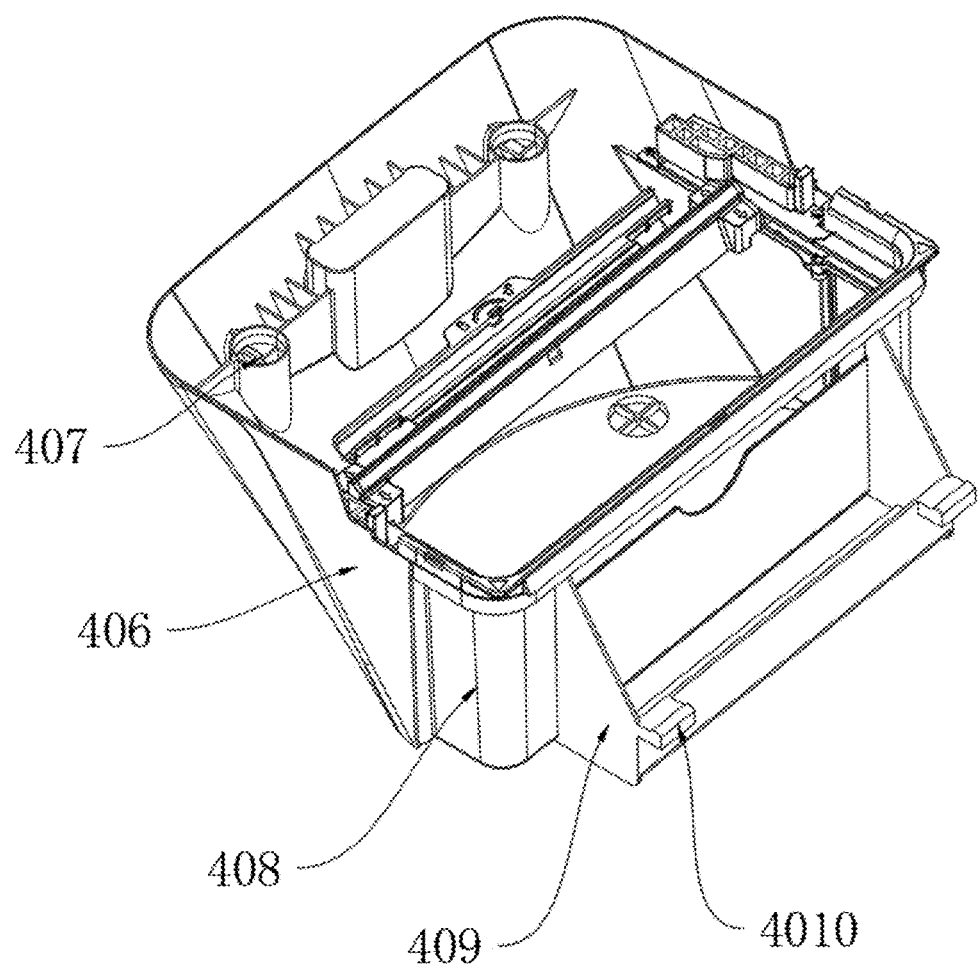
FIG. 11 is an internal structure diagram of a feces collecting bin of the present invention.
Figure 12:
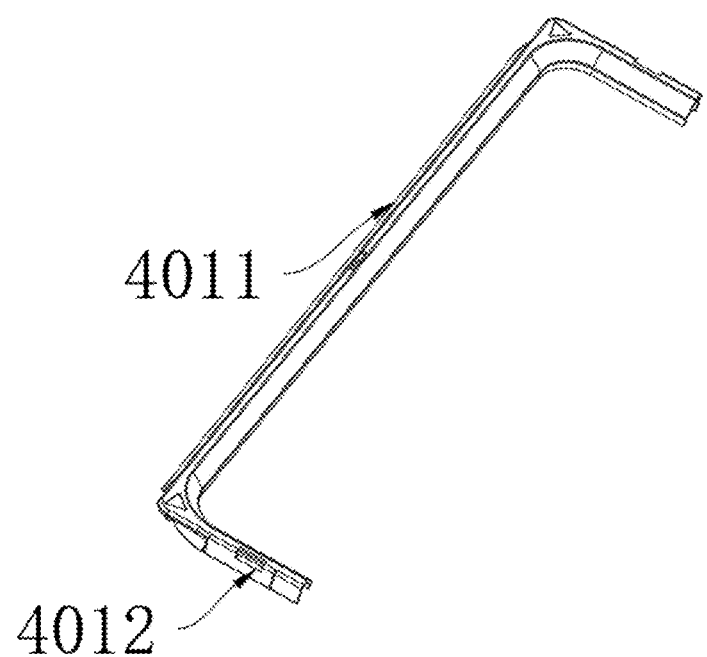
FIG. 12 is a mechanism diagram of a U-shaped pressing bar of the present invention.
Figure 13:
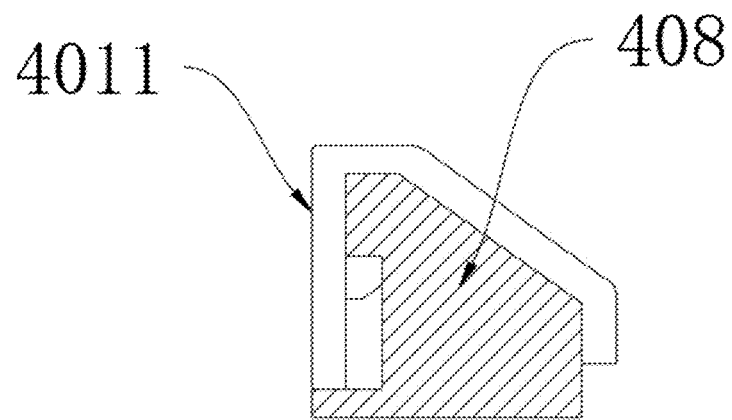
FIG. 13 is a cross-sectional diagram of a connection between a feces collecting bin and a U-shaped pressing bar of the present invention.

Compared to Example I, in Example II, a structure is disassembled to facilitate maintenance, disassembly for packaging, and transportation:

As shown in FIG. 11 and FIG. 12, the top of the rear bin of the feces collecting bin 4 is movably clamped and connected to a U-shaped pressing bar 4011. The U-shaped pressing bar 4011 is provided with a clamp groove 4012 thereon. The inner side of the clamp groove 4012 protrudes and is provided with a clamp bump. The upper end of the front bin of the feces collecting bin 4 corresponding to the clamp groove 4012 and the clamp bump and are provided with a mating groove. The clamp bump is snap-fitted into the mating groove via the U-shaped pressing bar 4011 so that the U-shaped pressing bar 4011 is mounted in the upper end of the front bin of the feces collecting bin 4, thereby fixing the side of the opening of a pet feces collecting bag. The inner wall of the rear bin of the feces collecting bin 4 is fixedly mounted with the corresponding sliding rail 4013 via a fixing bolt, respectively:

In the technical solution of the present invention, the inner part of the slide rail 4013 arranged at two sides is opened and provided with a sliding groove 4014. The two ends of a pressure-bearing seat are inserted in the inner part of the slide rail 4013 and slidingly connected in the sliding groove 4014 to realize the forward and backward movement of the sliding pressing bar 4015.

The present invention also provides the following example for the forward and backward movement of the pressure-bearing seat, that is, the inner part of the sliding groove 4014 is slidingly provided with a rolling ball 4016. The rolling ball 4016 is sleeved on mounting rods 4017 at both ends thereof. The mounting rods 4017 are mounted on the ends of the two sides of the sliding pressing bar 4015. The inner parts of the two ends of the sliding pressing bar 4015 are provided with a motor. An output terminal of the motor is coaxially provided with the rolling ball 4016. The motor is coaxially and rotatably provided with the rolling ball 4016. The two ends of the pressure-bearing seat are slidingly connected in the slide groove 4014 via the rolling ball 4016 fixed by the end of the rolling ball 4016. This setting of the structure can improve the overall stability and structural integrity. In a sliding process, direct jamming can also be avoided.

Figure 14:
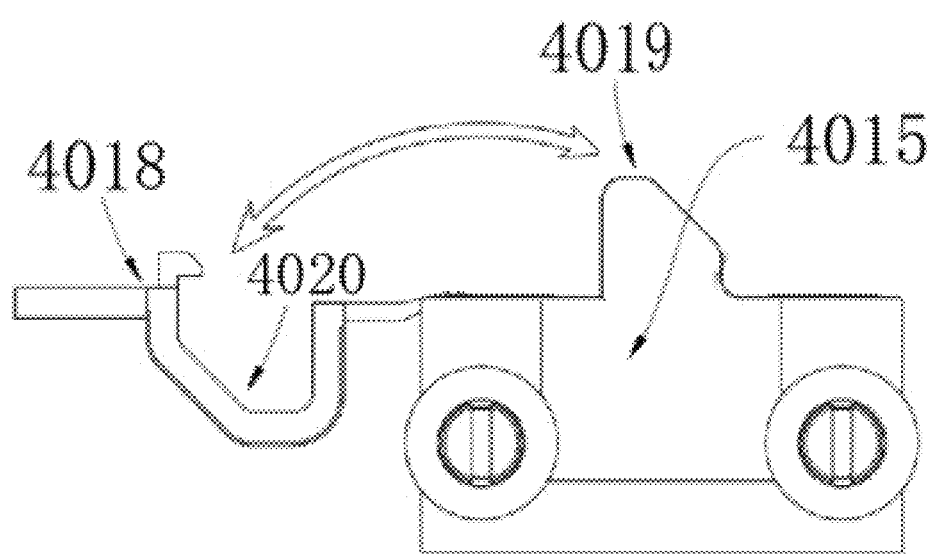
FIG. 14 is a side diagram of a sliding pressing bar of the present invention.
Figure 15:
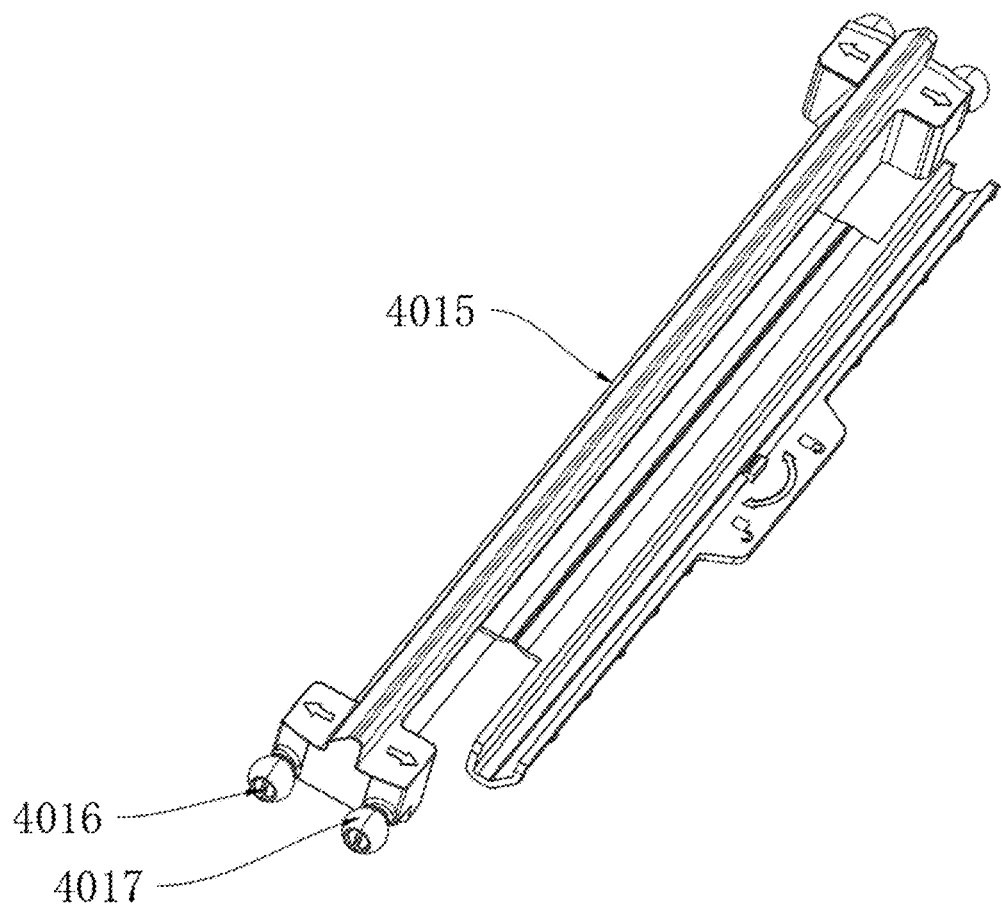
FIG. 15 is a perspective diagram of a sliding pressing bar of the present invention.
Figure 16:
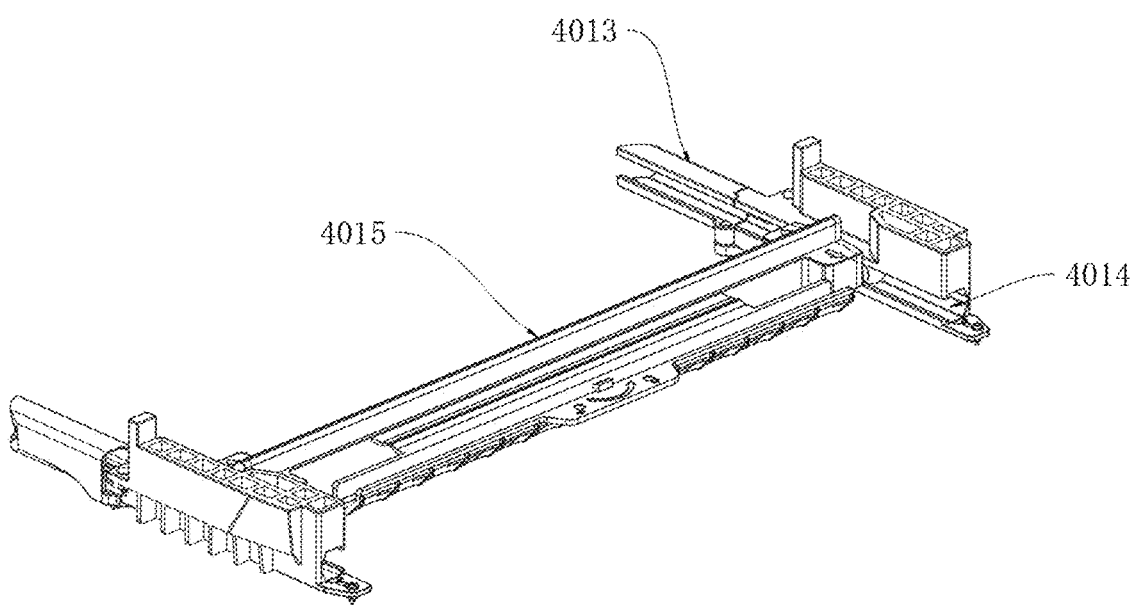
FIG. 16 is a schematic diagram of a connection between a sliding pressing bar and a sliding rail of the present invention.
Figure 17:
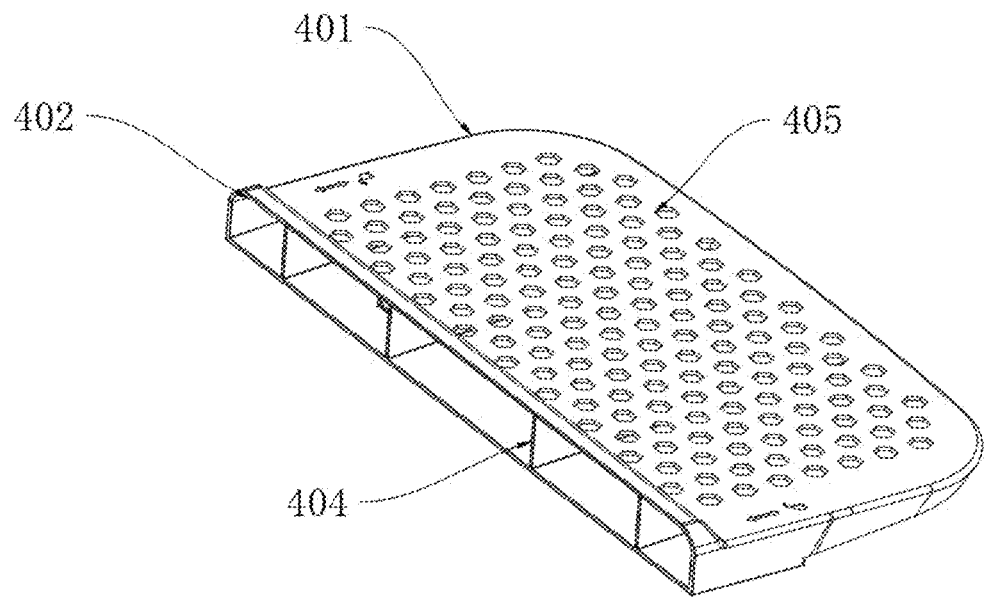
FIG. 17 is a structure diagram of a litter leakage pedal of the present invention.
Figure 18:
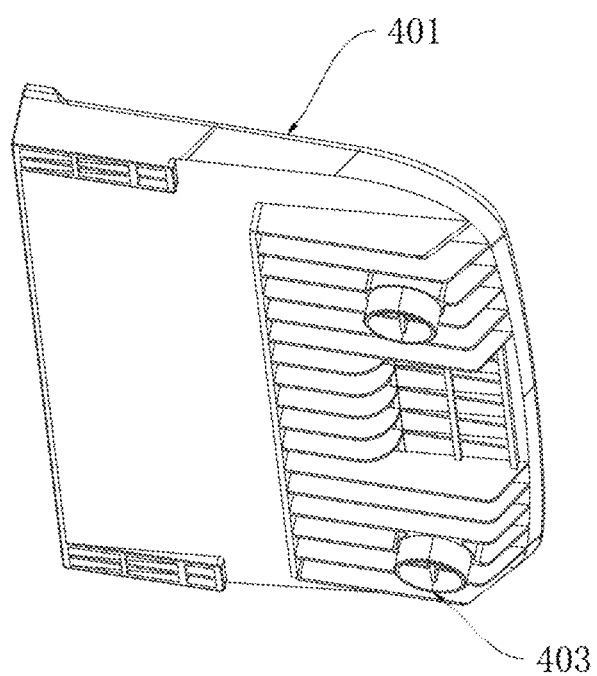
FIG. 18 is a structural diagram of a bottom of a litter leakage pedal of the present invention.
Figure 19:
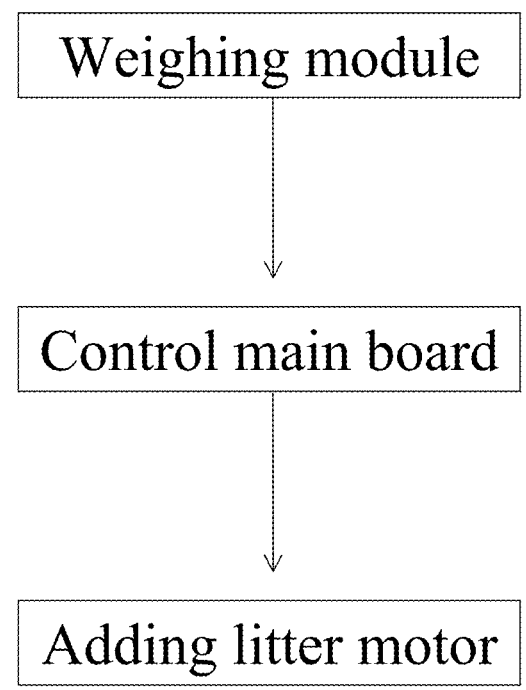
FIG. 19 is a schematic diagram of a control module of an adding litter motor of the present invention.

The sliding pressing bar 4015 moves forward to be close to the U-shaped pressing bar 4011. The sliding pressing bar 4015 moves backward to be away from the U-shaped pressing bar 4011. The sliding pressing bar 4015 is a foldable pressing bar. The sliding pressing bar 4015 is divided into a pressure-bearing seat 4019 and a foldable pressing bar 4018 as illustrated in FIG. 14. The middle of the pressure-bearing seat 4019 is opened and provided with a fastening groove 4020. The foldable pressing bar 4018 is connected to an outer side of the pressure-bearing seat 4019. The foldable pressing bar 4018 corresponds to the fastening groove 4020 as well as protrudes and is provided with a fastening part. The foldable pressing bar 4018 is turned over and clamped on the pressure-bearing bar and fixedly fastened in the fastening groove 4020.

The top of the rear bin of the feces collecting bin 4 is connected to a litter leakage pedal 401. The litter leakage petal 401 is embedded and mounted in the upper end of the rear bin of the feces collecting bin 4. The litter leakage pedal 401 is hollow. The end of the inner side of the litter leakage pedal 401 is opened and provided with an opening. The upper end surface of the litter leakage pedal 401 is passed through with, opened and provided with a litter leakage hole 405. The litter leakage hole 405, the middle of the litter leakage pedal 401 and the opening at the end of the inner side of the litter leakage pedal 401 form one passage. The upper end of the inner side of the litter leakage pedal 401 protrudes upward to form a position limiting part 402. The position limiting part 402 extends into the toilet bin 2. The hollow part of the litter leakage pedal 401 is provided with a plurality of partition plates 404. The upper end of the partition plate 404 is connected to the hollow upper end surface of the litter leakage pedal 401. The partition plate 404 separates the hollow part of the litter leakage pedal 401 to form a plurality of passages.

Before the toilet bin 2 is used, a user can remove the litter leakage pedal 401 from the top of the rear bin of the toilet bin 4. The U-shaped pressing bar 4011 can be removed. The foldable pressing bar can be turned over and removed from the pressure-bearing seat. With the backward and forward movement of the mounting bar 4017, the sliding pressing bar 4015 can be moved back and forth to position the collecting bag between the sliding pressing bar 4015 and the U-shaped pressing bar 4011. Then, the foldable pressing bar of the sliding pressing bar 4015 can be turned over and removed from the pressure-bearing seat. The open edge of the collecting bag rests on the pressure-bearing part of the sliding pressing bar 4015 and the upper end of the front bin of the feces collecting bin 4. The foldable pressing bar is further turned over, snap-fitted and fixed on the pressure-bearing seat. The U-shaped pressing bar 4011 is also snap-fitted and fixed on the upper end of the front bin of the feces collecting bin so that the collecting bag is placed and fixed. The user can then mount the litter leakage pedal 401 accordingly.

During the use of the device, as the feces collecting bin 4 is positioned below the toilet bin 2 for collecting feces, and the residue collected by the litter leakage pedal 401 also flows into the collecting bag. When the collecting bag is full, the user can remove the litter leakage pedal 401 and manually move the sliding pressing bar 4015 forward and backward, so that the collecting bag can be closed. When the closure of the collecting bag is complete, the foldable pressing bar is turned over to eliminate the fixture. Then, the sliding pressing bar 4015 is moved backward. At this time, the collecting bag is closed after the forward movement of the sliding pressing bar 4015. There is a height difference in position between the sliding pressing bar 4015 and the U-shaped pressing bar 4011. The sliding pressing bar 4015 can better move to the bottom of the U-shaped pressing bar 4011 in the process of moving forward, so as to achieve better closure effect of the collecting bag.

The two sides of the lower surface of the front end of the litter leakage pedal 401 are provided with a positioning round foot 403. The rear bin of the feces collecting bin corresponds to the positioning round foot 403 and is provided with a positioning base 407. The positioning round foot 403 matches the positioning base 407 to position the litter leakage pedal 401.

The side wall of the inner end of the front bin of the feces collecting bin is provided with a docking frame 409. A clamp plate 4010 is mounted at the end of the docking frame 409. The end of the clamp plate 4010 is provided with a plastic protrusion structure. An inner plate 301 is provided in the toilet bin opening 3 of the main machine. A position limiting clamp plate 302 is provided on the side wall of the inner plate 301. The docking frame 409 is clamped in the middle of a position limiting clamp plate 302. The side wall of the inner plate 301 is opened and provided with a docking groove 303. The upper end of the docking groove 303 is opened and provided with a clamp opening 304. The clamp plate 4010 is correspondingly embedded in the docking groove 303. The plastic protrusion structure is clamped and connected in the clamp opening 304. A handle hole is provided on the wall of the outer side of the rear bin of the feces collecting bin. The feces collecting bin 4 can be pulled out from the toilet bin opening 3 of the main machine by fastening a protrusion in the handle hole with a finger of the user. When being mounted, the feces collecting bin 4 can be pushed into the toilet bin opening 3 of the main machine.

The automatically adding litter bin 5 is provided with a damped upper cover thereon. The upper cover is provided with a visual glass. The inner part of the automatically adding litter bin 5 is provided with an automatically adding litter mechanism. The automatically adding litter mechanism includes a litter falling opening 501 opened and provided on the bottom surface of the automatically adding litter bin 5. The litter falling opening 501 is a sector-shaped structure. A central column 502 is rotatably mounted inside the automatically adding litter bin 5. A motor mounting plate is fixedly mounted on the bottom surface of the automatically adding litter bin 5 via the screw. An adding litter motor 503 is arranged on the motor mounting plate. Output terminals of the adding litter motor 503 are connected via a central column 502 of a gear set. A litter dividing member 504 is sleeved and fixed on the central column 502. A position limiting bar embedded in a recess of the side wall of the central column 502 is provided on the inner wall of the litter dividing member 504. The litter dividing member 504 is provided with five blades. The bottom surface of each of the blades can cover the litter falling opening 501. A gap between the adjacent blades has the same shape as the litter falling opening 501. A magnet is embedded and mounted in the bottom surface of the blade. A slit is arranged between the bottom surface of the blade and the automatically adding litter bin 5. The litter cannot enter the slit. The magnet attracts the bottom surface of the automatically adding litter bin 5, so that the litter dividing member 504 is more stably mounted on the central column 502. The litter is added to the automatically adding litter bin 5 to a marking line. The litter is distributed between the blades. The blade covers the litter falling opening 501. When the litter in the toilet bin 2 is insufficient, the adding litter motor 503 drives the central column 502 to rotate, so that the central column 502 drives the litter dividing member 504 to rotate. When the litter leaks out of the litter falling opening 501, the litter above on the litter falling opening falls into the toilet bin 2, there by adding the litter, which is more convenient without manual addition.

In order to control the rotation of the adding litter motor 503, the following way is adopted:

A control main board is arranged in the cat toilet main machine 1. The inner part of the toilet bin 2 is provided with a weighing module for weighing. The weighing module transmits the weight signal of the toilet bin 2 to the control main board. After receiving the weight signal, the control main board transmits the weight signal to the adding litter motor 503 and controls the rotation of the adding litter motor 503 to realize the process of litter addition.

In a signal transmission process as shown in the figures, in the technical design of the present invention, the weighing module, the control motherboard as well as a circuit connection structure for the weighing module and the control motherboard are assembled and used by using a mature product in the prior art. Therefore, in fact, the present invention is to protect the working principle that the signal generated by the weighing module is given to the control main board to control the adding litter motor 503.

The cat toilet main machine 1 is provided with a sterilization and deodorization assembly. The sterilization and deodorization assembly includes a UV sterilization lamp 6 and an ozone deodorizer 7. Two groups of the UV sterilization lamps 6 are mounted in the middle of the inner wall of the toilet bin 2 close to the top of the toilet bin. The opening of the toilet bin 2 is a hollow structure. The ozone deodorizer 7 is mounted in the opening above the feces collecting bin 4. The UV sterilization lamp 6 can sterilize the inner part of the toilet bin 2 to prevent bacterial growth. The ozone deodorizer 7 can generate ozone, which performs sterilization and deodorization and purifies a use environment.

Although the examples of the present invention have been shown and described, the person skilled in the art can understand that various changes, modifications, substitutions and variations can be made to these examples without departing from the principle and spirit of the present invention. The scope of the present invention is defined by the appended claims and their equivalents.

What is claimed is:

1. A device for cleaning a pet feces automatically and intelligently, comprising:
    a cat toilet main machine (1), a toilet bin (2) arranged inside the main machine, and a detachable feces collecting bin (4), wherein the toilet bin (2) and the feces collecting bin (4) are communicated to each other, the toilet bin (2) is provided therein with an automatically cleaning feces mechanism, and the automatically cleaning feces mechanism is configured to transport a feces in the toilet bin (2) to the feces collecting bin (4);
    wherein a U-shaped pressing bar (4011) is movably clamped and connected to a top of a rear bin of the feces collecting bin (4), a clamp groove (4012) is arranged on the U-shaped pressing bar (4011), an inner side of the clamp groove (4012) protrudes and is provided with a clamp bump, an upper end of a front bin of the feces collecting bin (4) corresponding to the clamp groove (4012) and the clamp bump are provided with a mating groove, and the clamp bump is snap-fitted into the mating groove via the U-shaped pressing bar (4011) so that the U-shaped pressing bar is mounted at the upper end of the front bin of the feces collecting bin (4), thereby fixing a side of an opening of a pet feces collecting bag;
    an inner wall of the rear bin of the feces collecting bin (4) is fixedly mounted with a corresponding sliding rail (4013) via a fixing bolt, respectively;
    an inner part of the sliding rail (4013) provided at two sides is opened and provided with a sliding groove (4014);
    a sliding pressing bar (4015) moves forward to be close to the U-shaped pressing bar (4011), the sliding pressing bar (4015) moves backward to be away from the U-shaped pressing bar (4011), the sliding pressing bar (4015) is a foldable pressing bar, the sliding pressing bar (4015) is divided into a pressure-bearing seat and a foldable pressing bar, two ends of the pressure-bearing seat are slidingly connected in the sliding groove (4014), a middle of the pressure-bearing seat is opened and provided with a fastening groove, the foldable pressing bar is connected to an outer side of the pressure-bearing seat, the foldable pressing bar corresponds to the fastening groove as well as protrudes and is provided with a fastening part, and the foldable pressing bar is turned over and clamped on a pressure-bearing bar and fixedly fastened in the fastening groove via the fastening part.

2. The device for cleaning the pet feces automatically and intelligently according to claim 1, wherein a front side of the toilet bin (2) is provided with an opening, the automatically cleaning feces mechanism comprises a litter shovel, the litter shovel is capable of sliding from a rear end of the toilet bin (2) to a front end of the toilet bin, and the feces collecting bin (4) is provided with a closable feces collecting opening at an end of a movement track of the litter shovel.

3. The device for cleaning the pet feces automatically and intelligently according to claim 2, wherein the automatically cleaning feces mechanism comprises a rotating device, a connecting swing arm, and the litter shovel; the litter shovel is connected to the rotating device via the connecting swing arm; and the rotating device drives the litter shovel to swing around a rotating axis of the rotating device.

4. The device for cleaning the pet feces automatically and intelligently according to claim 3, wherein a bottom of the toilet bin is provided with an arc-shaped part, and the arc-shaped part is shaped to match the movement track of an end of the litter shovel;
    an end of the arc-shaped part near the feces collecting opening is provided with a litter filtering strip; and the litter filtering strip extends along a direction of movement of the end of the litter shovel, so that the feces forms a gap with an inner wall of the toilet bin when the feces is plucked by the litter shovel to move towards the feces collecting opening.

5. The device for cleaning the pet feces automatically and intelligently according to claim 1, wherein the top of the rear bin of the feces collecting bin (4) is connected to a litter leakage pedal (401), the litter leakage pedal (401) is embedded and mounted in an upper end of a rear bin of the feces collecting bin (4), the litter leakage pedal (401) is hollow, an end of an inner side of the litter leakage pedal (401) is opened and provided with an opening, an upper end surface of the litter leakage pedal (401) is passed through with, opened and provided with a litter leakage hole (405), and the litter leakage hole (405), a middle of the litter leakage pedal (401), and an end of an inner side of the litter leakage pedal (401) are opened to form one passage;

an upper end of an inner side of the litter leakage pedal (401) protrudes upwardly to form a position limiting part (402), the position limiting part (402) extends into the toilet bin (2); a hollow part of the litter leakage pedal (401) is provided with a plurality of partition plates (404), an upper end of the partition plate (404) is connected to a hollow upper surface of the litter leakage pedal (401), and the partition plate (404) separates the hollow part of the litter leakage pedal (401) to form a plurality of passages;

two sides of a lower surface of a front end of the litter leakage pedal (401) are provided with a positioning round foot (403), the rear bin of the feces collecting bin corresponds to the positioning round foot (403) and is provided with a positioning base (407), and the positioning round foot (403) cooperates with the positioning base (407) to position the litter leakage pedal (401).

6. The device for cleaning the pet feces automatically and intelligently according to claim 1, wherein a side wall of an inner end of the front bin of the feces collecting bin (4) is provided with a docking frame (409), a clamp plate (4010) is mounted at an end of the docking frame (409), an end of the clamp plate (4010) is provided with a plastic protrusion structure, an inner plate (301) is provided in the main machine, a position limiting clamp plate (302) is provided on a side wall of the inner plate (301), the docking frame (409) is clamped in a middle of the position limiting clamp plate (302), the side wall of the inner plate (301) is opened and provided with a docking groove (303), an upper end of the docking groove (303) is opened and provided with a clamp opening (304), the clamp plate (4010) is correspondingly embedded in the docking groove (303), and the plastic protrusion structure is clamped and connected in the clamp opening (304).

7. The device for cleaning the pet feces automatically and intelligently according to claim 6, wherein a control main board is arranged in the cat toilet main machine (1), an inner part of the toilet bin (2) is provided with a weighing module for weighing, the weighing module transmits a weight signal of the toilet bin (2) to the control main board, after receiving the weight signal, the control main board transmits the weight signal to an adding litter motor (503) and controls the adding litter motor (503) to rotate to realize a process of litter addition.

8. The device for cleaning the pet feces automatically and intelligently according to claim 1, wherein the device for cleaning the pet feces automatically and intelligently is further provided with an automatically adding litter mechanism; the automatically adding litter mechanism comprises a litter falling opening (501) opened and provided at a bottom surface of an automatically adding litter bin (5), the litter falling opening (501) is a sector-shaped structure, a central column (502) is rotatably mounted in the automatically adding litter bin (5), one motor mounting plate is fixedly mounted on a bottom surface of the automatically adding litter bin (5) via a screw, an adding litter motor (503) is arranged on the motor mounting plate, output terminals of the adding litter motor (503) are connected via the central column (502) of a gear set, and a litter dividing member (504) is fixedly sleeved on the central column (502).

9. The device for cleaning the pet feces automatically and intelligently according to claim 8, wherein an inner wall of the litter dividing member (504) is provided with a position limiting bar embedded in a recess of a side wall of the central column (502), the litter dividing member (504) is provided with five blades, a bottom surface of each of the blades is capable of covering the litter falling opening (501), a gap between adjacent blades has the same shape as the litter falling opening (501), and a magnet is embedded and mounted on a bottom surface of the blade.

\* \* \* \* \*